United States Patent [19]

Hasan et al.

[11] Patent Number: 5,069,588
[45] Date of Patent: Dec. 3, 1991

[54] ANCHORING DEVICE

[75] Inventors: Syed R. Hasan, Palatine; Mark A. Packard, Rockford; Michael P. Ditka, Deerfield, all of Ill.

[73] Assignee: Illinois Tool Works Inc., Glenview, Ill.

[21] Appl. No.: 581,806

[22] Filed: Sep. 13, 1990

[51] Int. Cl.⁵ .............................................. F16B 15/00
[52] U.S. Cl. .................................. 411/439; 411/447; 411/451
[58] Field of Search .............. 411/456, 447, 473, 474, 411/475, 482, 487, 493, 498, 446, 451, 439, 452, 453, 494, 922, 24, 25, 27, 354, 448, 449, 476, 492, 487, 78

[56] References Cited

U.S. PATENT DOCUMENTS

| | | | |
|---|---|---|---|
| 1,798,273 | 3/1931 | Pleister | 411/439 X |
| 2,501,701 | 3/1950 | Tinnerman | 411/449 |
| 3,518,915 | 7/1970 | Gutshall | 411/39 |
| 4,037,512 | 7/1977 | Sundberg | 411/449 |

FOREIGN PATENT DOCUMENTS 539166 12/1976 U.S.S.R. ................................ 411/38

Primary Examiner—Rodney M. Lindsey
Attorney, Agent, or Firm—Schwartz & Weinrieb

[57] ABSTRACT

An anchoring device having a head and a shank to be forcibly driven into a hole defined within concrete is disclosed. The shank has proximal, transitional, and distal portions defining respective axes that do not coincide when the shank is unstressed and further defining proximal and distal elbows. Notches enhancing frictional engagement between the shank and the hole wall are formed along convex surfaces of the elbows, as well as long substantially cylindrical surfaces of the proximal, transitional, and distal portions of the shank.

10 Claims, 1 Drawing Sheet

ANCHORING DEVICE

TECHNICAL FIELD OF THE INVENTION

This invention pertains to an anchoring device having a head, which is adapted to mount an external element, and a shank, which is adapted to be forcibly driven into a hole that has been drilled into a body of concrete, masonry, or like material so as to become anchored within the hole.

BACKGROUND OF THE INVENTION

Various anchoring devices are known, which are designed to be forcibly driven into a hole that has been drilled into a body of concrete, masonry, or like material so as to become anchored within the hole. Concrete and masonry are characterized by means of high compressive strength and, therefore, exhibit very little yield when compressed. Typically, such an anchoring device has a head, which is adapted to mount an external element, and a shank, which is integral with the head. When the head is struck by means of a hammer or by means of a driving ram of a powered tool, the shank is driven forcibly into the hole, within which the shank becomes anchored.

Two-piece anchoring devices are known, in which sleeves or other elements are expanded when such devices are driven into the hole. One-piece anchoring devices are known, moreover, and are preferred in many applications. Typically, a one-piece anchoring device has a shank portion that is deformed when such device is driven into a hole. The deformed portion anchors the shank within the hole.

A variation of a one-piece anchoring device is disclosed in Giannuzzi U.S. Pat. No. 4,828,445. As disclosed therein, the anchoring device has a resilient shank, which is shaped with one or more undulations near its distal end, and which is smooth-surfaced.

Other anchoring devices of related interest are disclosed in Carroll U.S. Pat. No. 1,574,790, French Patent No. 2,468,024, German Patent Application No. 915,732, German Patent Application No. 3,620,372, and Japanese Patent Application (Laid-Open Publication) No. 55-122,918.

An improved, one-piece anchoring device is disclosed in a copending patent application, U.S. Ser. No. 07/459,491, which was filed by Martin J. Nilsen, and which is assigned commonly herewith.

This invention is addressed to improvements in an anchoring device exemplified by the anchoring device disclosed in the copending application noted above.

SUMMARY OF THE INVENTION

An anchoring device according to this invention has a head and a shank integral with the head. The head is adapted to mount an external element. The shank is adapted to be forcibly driven into a hole with a cylindrical wall defined within a body of concrete, masonry, or like material so as to become anchored within the hole when the head is struck. By means of this invention, frictional engagement of the shank with the cylindrical wall of the hole is enhanced, so as to resist forces tending to pull the shank from the hole.

The shank is formed with a proximal portion adjacent to the head and a distal portion spaced from the proximal portion. Each such portion is substantially straight when the shank is unstressed. The shank is also formed with a transitional portion, which is joined to the proximal portion at a proximal elbow, and which is joined to the distal portion at a distal elbow.

The shank has a spring temper. A preferred material for the shank (and for the anchoring device if it is made as one piece) is American Iron and Steel Institute (AISI) C 1038 or C 1040 steel, which has been heat-treated to a spring temper after it has been formed with the proximal, transitional, and distal portions.

The anchoring device is formed with notches defined within the shank. The notches enhance frictional engagement between the shank and the cylindrical wall of the hole. It is a characteristic feature of this invention that at least some of the notches are located upon or within convex surfaces of the respective elbows.

Preferably, each of the proximal and distal portions of the shank has a substantially cylindrical surface, along which other ones of the notches are located. Preferably, as well, the transitional portion of the shank is substantially straight when the shank is unstressed and has two substantially cylindrical, diametrically opposed surfaces, along which other one of the notches are located.

Moreover, in a preferred arrangement, the notches are arrayed in two lines along the shank. A first line of the notches extends along the substantially cylindrical surface of the proximal portion, along the convex surface of the proximal elbow, and along a given one of the substantially cylindrical surfaces of the transitional portion. A second line of the notches extends along the substantially cylindrical surface of the distal portion, along the convex surface of the distal elbow, and along the other one of the substantially cylindrical surfaces of the transitional portion. The lines are diametrically opposite to each other upon the transitional portion of the shank.

BRIEF DESCRIPTION OF THE DRAWINGS

These and other objects, features, and advantages of this invention are evident from the following description of a preferred embodiment of this invention with reference to the accompanying drawings, in which like reference characters designate like or corresponding parts throughout the several views, and wherein.

DETAILED DESCRIPTION OF THE ILLUSTRATED EMBODIMENTS

Figure 1:
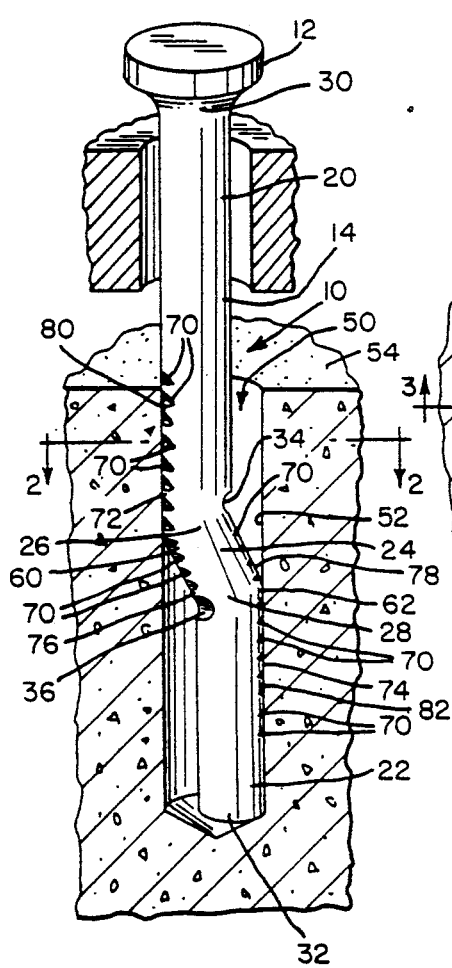
FIG. 1 is a perspective view of an anchoring device with a shank of a relatively small diameter along its substantially straight portions, as anchored within a hole defined within a body of concrete, masonry, or like material, which is shown fragmentarily, in cross-section, a fixture also being shown fragmentarily, in cross-section.

While a preferred embodiment of this invention and an alternate embodiment thereof are illustrated in the drawings and are hereinafter described, it is to be understood that these are exemplary embodiments and that this invention is not limited to the illustrated embodiments. Examples of alternative heads contemplated by means of this invention are disclosed in the copending application noted above.

The anchoring device of each of the illustrated embodiments is made as one piece, preferably from American Iron and Steel Institute (AISI) C 1038 or C 1040 steel, which has been heat-treated to a spring temper after the shank has ben formed in a manner to be hereinafter described. Preferably, he heat-treated steel has a hardness within the range of approximately Rockwel C 23 to about Rockewl C 34, a minimum yield strength of approximately 92,000 psi, and a minimum extensive strength of approximately 120,000 psi.

Figure 2:
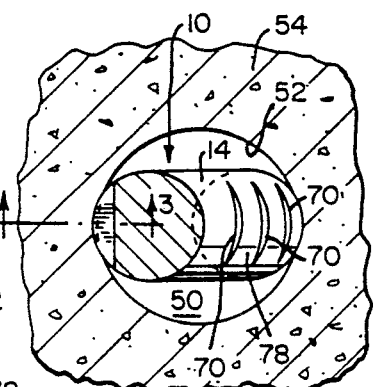
FIG. 2, on a somewhat enlarged scale, is a fragmentary, sectional view taken along line 2—2 in FIG. 1, in a direction indicated by means of the arrows.
Figure 3:
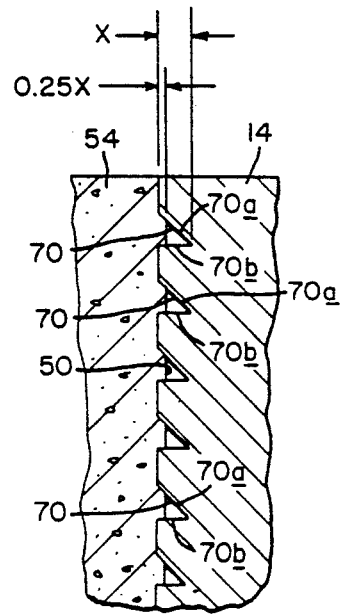
FIG. 3, on a greatly enlarged scale, is a fragmentary, sectional view taken along line 3—3 in FIG. 2, in a direction indicated by means o the arrows.

As shown in FIGS. 1, 2, and 3, an anchoring device 10 having a head 12 and a shank 14, which is integral with the head 12, constitutes a preferred embodiment of this invention. As shown, the head 12 is a button head. However, an anchoring device according to this invention may be alternatively formed with a different head (not shown) such as a head defining a threaded stud or a head defining an eyelet, as disclosed in the copending application noted above.

The anchoring device 10 is formed from a blank (not shown) including a portion of a substantially uniform, substantially circular cross-section to be formed into the shank 14, by means of stamping, forging, or swaging the blank so as to form he head 12 and the shank 14 before the anchoring device 10 is heat-treated. Specifically the shank 14 is formed so as to have a proximal portion 20 adjacent to the heat 12, a distal potion 22 spaced from eh proximal portion 20, and a transitional portion 24 interposed between the proximal portion 20 and the distal portion 22. The transitional portion 24 is joined to the proximal portion 20 at a proximal elbow 26 and is joined to the distal portion 22 at a distal elbow 28. The shank 14 has a proximal end 30, which is joined to the head 12, and a distal end 32.

The shank 14 is formed so that the proximal portion 20, the distal portion 22, and the transitional portion 24 are substantially straight when the shank 14 is unstressed. Thus, the proximal portion 20, the distal portion 22, and the transitional portion 24 define respective axes, which are substantially coplanar when the shank 14 is unstressed. The axis defined by means of the proximal portion 20 and the axis defined by means of the distal portion 22 are substantially parallel but spaced apart when the shank 14 is unstressed. The axis defined by means of the transitional portion 24 intersects each of these substantially parallel axes at a substantially similar acute angle when the shank 14 is unstressed.

The shank 14 is formed with a tool indentation 34 where the proximal elbow 26 is concave and with a tool indentation 36 where the distal elbow 28 is concave. The tool indentations 34, 36, are lenticular. The shank 14 has a substantially uniform, substantially circular cross-section, except at the proximal elbow 26 where the tool indentation 34 provides the shank 14 with a smaller, non-circular cross-section, and except at the distal elbow 36 where the tool indentation 28 provides the shank 14 with a smaller, non-circular cross-section.

The smaller, non-circular cross-sections of the shank 14 at the tool indentations 34, 36, facilitate forming the shank 14 by causing the shank 14 to be preferentially bendable at the elbows 26, 28, as the shank 14 is formed.

As shown in FIG. 1, the shank 14 çan be easily driven into a hole 50 with a cylindrical wall 52 defined within a body 54 of concrete, masonry, or like material so as to become anchored within the hole 50. Such material is characterized by means of high compressive strength and, therefore, exhibits very little yield when compressed. When the head 12 is struck by means of a hammer (not shown) or by means of a driving ram (not shown) of a powered tool, the shank 14 is driven forcibly into the hole 50, within which the shank 14 becomes anchored.

The proximal elbow 26 has a convex surface 60 disposed opposite to the tool indentation 34. The distal elbow 28 has a convex surface 62 disposed opposite to the tool indentation 36.

In the foregoing respects, the anchoring device 10 may be substantially similar to the anchoring device disclosed in the copending application noted above. As explained below, however, the anchoring device 10 has features not found in the anchoring device disclosed in such application.

Two lines of similar notches 70 are formed within the shank 14. The notches 70 enhance frictional engagement between the shank 14 and the cylindrical wall 52 of the hole 50. It is a characteristic feature of this invention that at least some of the notches 70 are formed upon the convex surfaces 60, 62, of the respective elbows The proximal portion 20 of the shank 14 has a substantially cylindrical surface 72, along which other ones of the notches 70 are located. The distal portion 22 of the shank 14 has a substantially cylindrical surface 74, along which still other ones of the notches 70 are located. The transitional portion 24 of the shank 14 has two substantially cylindrical, diametrically opposed surfaces 76, 78, along which yet other ones of the notches 70 are located.

As shown, the notches 70 are arrayed in two lines along the shank 14. One such line 80 of the notches 70 extends along the substantially cylindrical surface 72 of the proximal portion 26, along the convex surface 60 of the proximal elbow 26, and along a given one of the substantially cylindrical surfaces of the transitional portion 24, namely the substantially cylindrical surface 76. The other line 82 of the notches 70 extends along the substantially cylindrical surface 74 of the distal portion 22, along the convex surface 62 of the distal elbow 28, and along the other one of the substantially cylindrical surfaces of the transitional portion 24, namely the substantially cylindrical surface 78.

As shown, each of the notches 70 is unidirectional, as defined by means of a leading surface 70a intersecting the outer surface of the shank 14 at an angle of approximately 45° and by a trailing surface 70b intersecting such surface at an angle of approximately 90°. Thus, in comparative terms, the notches 70 provide the shank 14 with lesser resistance to insertion into a hole, such as, for example, the hole 50 and with greater resistance to withdrawal from such a hole.

As shown in FIG. 3, each of the notches 70 has a radial depth x. As suggested in FIG. 3, when the shank 14 is anchored within the hole 50, the material surrounding the hole 50 tends to penetrate each of the notches 70 along the substantially cylindrical surfaces of the proximal and distal portions of the shank 14 to a nominal depth of approximately 0.25x.

Figure 4:
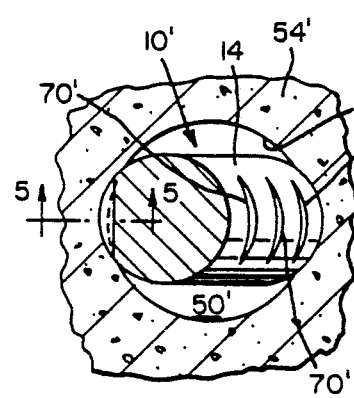
FIG. 4 is a view analogous to FIG. 2 but taken to show an anchoring device with a shank of a relatively large diameter along its substantially straight portions, as anchored within within a hole similar to the hole shown in FIGS. 1, 2, and 3.
Figure 5:
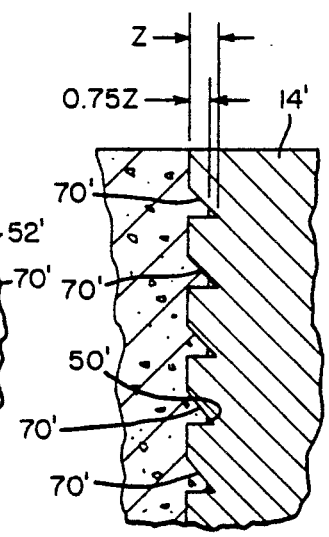
FIG. 5 is a view analogous to FIG. 3, as taken along line 5—5 in FIG. 4, in a direction indicated by means of the arrows.

An anchoring device 10' constituting an alternate embodiment of this invention is shown in FIGS. 4 and 5. The anchoring device 10' is similar to the anchoring device 10 in all respects, except that the anchoring device 10' has a shank 14' with a nominal diameter along its substantially cylindrical surfaces that is greater than the nominal diameter of the shank 14 of the anchoring device 10.

Moreover, the shank 14' of the anchoring device 10' is formed with notches 70', which are similar to the notches 70 formed within the shank 14 of the anchoring device 10. The anchoring device 10' is shown with its shank 14' anchored within a hole 50' with a cylindrical wall 52' defined within a body 54' of concrete, masonry, or like material. The hole 50' is similar to the hole 50. The holes 50, 50', have approximately equal diameters.

As shown in FIG. 5, each of the notches 70' has a radial depth z equal approximately to the radial depth x of each of the notches 70 formed within the shank 14 of the anchoring device 10. As suggested in FIG. 5, when the shank 14' is anchored within the hole 50', the material surrounding the hole 50' tends to penetrate each of the notches 70' along the substantially cylindrical surfaces of the proximal and distal portions of the shank 14' to a nominal depth of approximately 0.75 z.

FIGS. 3 and 5 are intended to show that penetration of the material surrounding the hole into the notches along the substantially cylindrical surfaces of the proximal and distal portions of the shanks depends to some extent upon the relative diameters of those portions and of the hole.

Because an anchoring device according to this invention has notches along the convex surfaces of the proximal and distal elbows, frictional engagement between the shank and the cylindrical wall of the hole is enhanced. Enhanced frictional engagement therebetween results in enhanced resistance to withdrawal of the shank from the hole, particularly if the anchoring device becomes misaligned so that the proximal and distal portions of the shank are not aligned in parallel relation with respect to the axis of the hole.

Various modifications may be made in the embodiments described above without departing from the scope and spirit of this invention. It is therefore to be understood that within the scope o the appended claims, the present invention may be practiced otherwise than as specifically described herein.

We claim:

1. An anchoring device, comprising:
   a head; and
   a shank integral with said head and adapted to be forcibly driven into a material within which said anchoring device si to be fixed;
   said shank comprising two substantially straight leg portions disposed in substantially parallel planes with respect to each other when said shank is unstressed, said leg portions comprising a first longitudinal axis defined therealong, a second distal portion spaced from said proximal potion and having a second longitudinal axis defined therealong, and a transitional portion interconnecting said fist proximal and second distal portions together, said transitional portion being connected to said proximal portion by means of a proximal elbow portion, and being connected to said distal portion by means of a distal elbow portion, said proximal and sit al elbow portions including convex surface portions, and said proximal potion, said distal portion, said convex surface portion of said proximal elbow portion, and said convex surface portion of said distal elbow portion each being provided with notch means disposed transversely to said longitudinal axes of said proximal and distal portions or frictionally engaging sidewall portions of a bore defined within said material and into which said anchoring device is to be fixed.

2. The anchoring device of claim 1 wherein each of the proximal and distal portions has a substantial cylindrical surface along which said notches are located.

3. The anchoring device o claim 2 wherein the transitional portion is substantially straight when the shank is unstressed and has two substantially cylindrical, diametrically opposed surfaces, along which other ones of said notches are located.

4. The anchoring device of claim 3 wherein the notches are arrayed in two lines along the shank, namely in a first a line extending along the substantially cylindrical surface of the proximal portion, along the convex surface of the proximal elbow, and along a given one of the substantially cylindrical surfaces of the transitional portion and in a second line extending along the substantially cylindrical surface of the distal portion, along the convex surface of the distal elbow, and along the other one of the substantially cylindrical surfaces of the transitional portion, the lines being diametrically opposite with respect to each other along said transitional portion.

5. An anchoring device as set forth in claim 1, wherein:
   said distal portion of aid shank includes a free end portion, opposite an end portion of aid distal portion which is connected to said transitional portion of aid shank, which is disposed further away from said head of said anchoring device than said end portion of said distal portion which is connected to aid transitional portion of said shank.

6. An anchoring device as set forth in claim 1, wherein:
   said transitional portion is disposed at a predetermined inclined angle with respect to said first proximal and second distal portions of said shank.

7. An anchoring device as set forth in claim 1, further comprising:
   indentation means defined with in said shank at positions disposed diametrically opposite said convex elbow portions so as to facilitate formation of said elbow portions upon said shank.

8. An anchoring device as set forth in claim 7, wherein:
   said notch means are disposed within two linear arrays disposed upon diametrically opposite sides of said shank, a first one of said linear arrays extending along said proximal portion, said proximal elbow portion, and said transitional portions to a first one of said indentation means, and said second one of said linear arrays extends along said distal portion, said distal elbow portion, and said transitional potion upon to a second one of said indentation means.

9. An anchoring device as set forth in claim 1, wherein each of said notch means comprise:
   a fist leading end portions as viewed in the direction in which said anchoring device as driven into said material, which is inclined with respect to one of aid longitudinal axes of said shank at a predetermined angle, and a second trailing end portion which is disposed substantially perpendicular to one of said longitudinal axes of said shank whereby insertion of said anchoring device into said material is facilitated whereas withdrawal of said anchoring device form said material is impeded.

10. An anchoring device as set forth in claim 9, wherein:
said first leading end portion of each of said notch means is disposed at an angle of 45° with respect to said one of said longitudinal axes of said shank.

* * * * *